United States Patent
Scholl

(10) Patent No.: US 8,880,337 B2
(45) Date of Patent: Nov. 4, 2014

(54) NAVIGATION SYSTEM FOR AN ELECTRIC VEHICLE

(71) Applicant: Harman Becker Automotive Systems GmbH, Karlsbad (DE)

(72) Inventor: Kay-Ulrich Scholl, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 13/773,425

(22) Filed: Feb. 21, 2013

(65) Prior Publication Data

US 2013/0218458 A1 Aug. 22, 2013

(30) Foreign Application Priority Data

Feb. 22, 2012 (EP) .................................... 12001176

(51) Int. Cl.
*G01C 21/34* (2006.01)
*B60L 11/18* (2006.01)
*G08G 1/0962* (2006.01)
*G01C 21/32* (2006.01)
*G01C 21/36* (2006.01)

(52) U.S. Cl.
CPC ......... *G01C 21/3469* (2013.01); *B60L 11/1824* (2013.01); *Y04S 30/12* (2013.01); *Y02T 90/168* (2013.01); *B60L 2240/622* (2013.01); *B60L 11/1816* (2013.01); *G08G 1/0962* (2013.01); *B60L 2250/16* (2013.01); *G01C 21/32* (2013.01); *B60L 11/1861* (2013.01); *G08G 1/09626* (2013.01); *B60L 2240/72* (2013.01); *G01C 21/3697* (2013.01); *G01C 21/3682* (2013.01)
USPC ........................................................ 701/426

(58) Field of Classification Search
USPC ............................................................ 701/426
See application file for complete search history.

(56) References Cited

U.S. PATENT DOCUMENTS 5,815,824 A * 9/1998 Saga et al. ...................... 701/22
2011/0224900 A1* 9/2011 Hiruta et al. .................. 701/201
(Continued)

FOREIGN PATENT DOCUMENTS

EP 2368750 A2 9/2011
JP 9210702 A 8/1997
(Continued)

OTHER PUBLICATIONS

European Search Report issued in European Application No. 12001176.2 dated Jul. 2, 2012, 8 pgs.

*Primary Examiner* — Thomas Tarcza
*Assistant Examiner* — Alex C Dunn
(74) *Attorney, Agent, or Firm* — Alleman Hall McCoy Russell & Tuttle LLP

(57) ABSTRACT

A navigation system for an electric vehicle may ascertain a selection of a charging station based on a user input, wherein a stored position of the charging station is an ultimate destination. The navigation system can ascertain a current position of the electric vehicle. In addition, the navigation system can ascertain a reachability of a target position that is separated from the current position and the stored position of the charging station. The ascertainment of reachability can be based on the current position of the electric vehicle, the stored position of the selected charging station, and the current state of charge of the energy storage device, so that the target position and subsequently the stored position of the selected charging station are reachable with the current state of charge of the energy storage device.

20 Claims, 2 Drawing Sheets

(56) References Cited

U.S. PATENT DOCUMENTS

| | | |
|---|---|---|
| 2011/0288765 A1* | 11/2011 | Conway ................. 701/201 |
| 2012/0019204 A1 | 1/2012 | Matsuo et al. |
| 2012/0078743 A1* | 3/2012 | Betancourt ............. 705/26.3 |
| 2012/0158229 A1* | 6/2012 | Schaefer ................. 701/22 |
| 2012/0173061 A1* | 7/2012 | Hanley et al. ............ 701/22 |
| 2012/0173134 A1* | 7/2012 | Gutman ................. 701/400 |
| 2012/0179359 A1* | 7/2012 | Profitt-Brown et al. ... 701/123 |
| 2012/0221234 A1* | 8/2012 | Sujan et al. ............ 701/123 |

FOREIGN PATENT DOCUMENTS

| | | |
|---|---|---|
| JP | 2001215124 A | 8/2001 |
| WO | WO 2010/150665 A1 | 12/2010 |
| WO | WO 2011/006775 A2 | 1/2011 |
| WO | WO 2011/098195 A1 | 8/2011 |

\* cited by examiner

NAVIGATION SYSTEM FOR AN ELECTRIC VEHICLE

BACKGROUND OF THE INVENTION

1. Priority Claim

This application claims the benefit of priority from European Patent Application No. EP12001176.2, filed Feb. 22, 2012, which is incorporated by reference.

2. Technical Field

The present invention concerns a navigation system and more specifically, a navigation system for an electric vehicle.

3. Related Art

A navigation system of a vehicle can use an internal or external database that contains so-called Points of Interest (POIs) in different categories. For example, filling stations are included as POIs. Some motor vehicles are designed to calculate fuel consumption and a remaining range. For example, there is an indication as to the distance (miles or kilometers driven) within which a filling station can be found.

SUMMARY

A navigation system for use in an electric vehicle can ascertain a selection of a charging station based on a user input. A stored position of the charging station can be identified as the ultimate destination of the electric vehicle for purposes of developing a navigation route. The navigation system can determine a current position of the electric vehicle and ascertain a reachability of a target position that is separated from the current position and the stored position of the charging station.

Determination by the navigation system that target position is reachable is based on the current position of the electric vehicle, the stored position of the selected charging station, and the current state of charge of an energy storage device included in the electric vehicle. The navigation system can confirm the target position is reachable based on the target position and subsequently the stored position of the selected charging station being reachable with the current state of charge of the energy storage device. The navigation system can output the determination of reachability of the target position to a user using an information item. The information item can be output for display on an output device of the navigation system.

Other systems, methods, features and advantages may be, or may become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The navigation system may be better understood with reference to the following drawings and description. The components in the figures are not necessarily to scale, emphasis instead being placed upon illustrating the principles of the navigation system. Moreover, in the figures, like referenced numerals designate corresponding parts throughout the different views.

DETAILED DESCRIPTION

Figure 1:
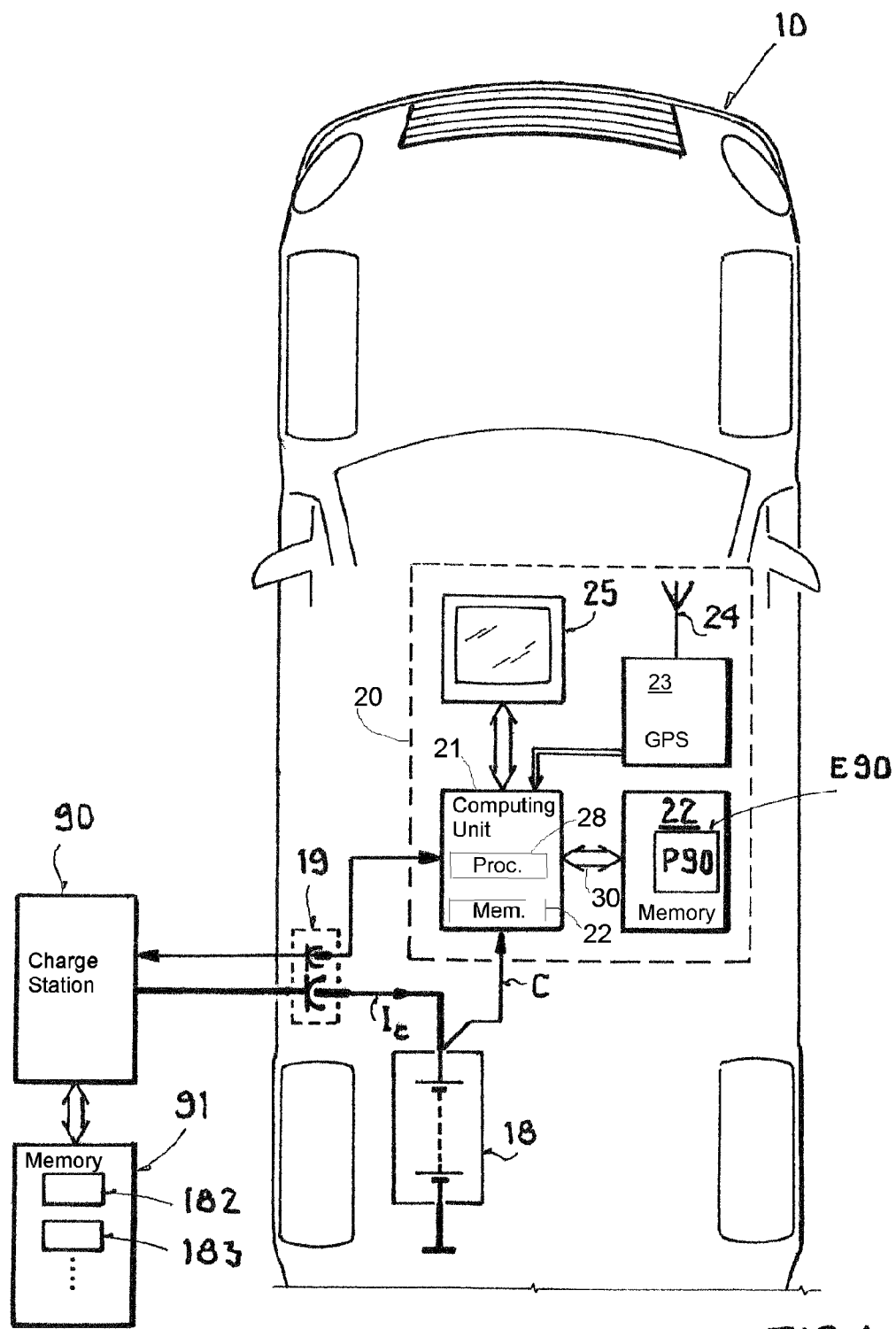
FIG. 1 is a schematic representation of an example electric vehicle.

A navigation system can provide improved operation of an electric vehicle by ascertaining a selection of a charging station based on a user input. A stored position of the charging station is the ultimate destination, for example home. The navigation system can ascertain a current position of the electric vehicle. The navigation system can ascertain a reachability of a target position that is separated from the current position and the stored position of the charging station. The ascertainment can be based on the current position of the electric vehicle, the stored position of the selected charging station, and the current state of charge of the energy storage device, so that the target position, and subsequently the stored position of the selected charging station, are reachable with the current state of charge of the energy storage device. The navigation system can output the reachability of the target position by means of an information item via an output device of the navigation system.

Accordingly, a navigation system for an electric vehicle is provided. The navigation system includes a computing unit. The navigation system may have an internal and/or external database. The navigation system may have a position finding unit.

The computing unit is configured to ascertain a selection of a charging station based on a user input, wherein a stored position of the charging station is the ultimate destination. The ultimate destination may be a home destination. The computing unit is configured to ascertain a current position of the electric vehicle. The computing unit is also configured to ascertain a reachability of a target position geographically separated from the current position and the stored position of the charging station. The ascertainment by the computing unit can be based on the current position of the electric vehicle, the stored position of the selected charging station, and the current state of charge of the energy storage device, so that the target position, and subsequently the stored position of the selected charging station, are reachable with the current state of charge of the energy storage device.

The computing unit is configured to output the reachability of the target position by means of an information item via an output device of the navigation system. The output device may be a display for displaying the information item.

According to an example operation of the navigation system, the information item may be output on a map view by means of a symbol. In another example, the information item may be output on a map view by means of an area marking. The area marking may be accomplished by means of a line or a polygon. The line or polygon may enclose the marking area. It is also possible to highlight the marking area, for example by displaying the marking area as being raised out of the plane of the map (in height/depth) in an animated fashion.

Example operation of the navigation system may include displaying the selection of the charging station by a selection item. The selection item may, for example, particularly have a marking and/or symbol and/or text on a map view. The reachability of the target position may be ascertained after the selection of the charging station, with the stored position of the charging station being the ultimate destination. In addition, the navigation system can additionally ascertain a direct reachability of the stored position of the charging station based on a current charge state of the energy storage device and a current position of the electric vehicle. The direct reachability may be output via the output device of the navigation system by means of an additional information item. In the following discussion, the direct reachability of the stored position is referred as a first reachability, whereas the reachability of the target position and subsequently the ultimate destination is referred to as a second reachability.

The navigation system may store an entry associated with the charging station in association with a position of the charging station in a database accessible to the navigation system, if the entry associated with the charging station is not present in the database. Storing of the position of the charging station may be initiated by a connection to the charging station. An attribute associated with the charging station may be stored in an entry in the database. The reachability of the target position and/or the direct reachability of the stored position may be determined as a function of the attribute. A third information item associated with the attribute may be output.

Storing of the entry may be displayed by the navigation system. During display of the storage, the entry can be modified or deleted based on a user input.

A check may be performed by the navigation system as to whether an entry associated with the charging station is present in a database of a navigation system of the electric vehicle. The check may be performed, by a computing unit of the navigation system. The checking may be initiated by the connection to the charging station.

The computing unit may, for example, be connected to an interface in order to identify a connection of the electric vehicle to a charging station for charging of an energy storage device of the electric vehicle. The computing unit may be configured to check, after being initiated by the connection to the charging station, whether an entry associated with the charging station is present in the navigation system's database. The computing unit may be configured to store the entry associated with the charging station in the database along with a position of the charging station, if the entry associated with the charging station is not already present in the database.

The check for the entry in the database can take place according to different conditions. For example, the check can take place in that a position is ascertained by means of, for example, the position finding unit during the connection of the computing unit to the interface. If the ascertained position for a charging station is already present in the database, the check is ended. For example, the position can be determined to be present in the database when the position ascertained by means of the position finding unit and the position in the database differ from one another by less than a maximum predetermined distance, for example 30 meters. Alternatively, or in addition, an identification, such as a unique identifier, can be associated with each charging station. For example, an identifier can be transmitted by the charging station to the navigation system. If the transmitted identification received from the charging station is identical to an identification stored in the database, the charging station is determined to already be present as an entry in the database. In other examples, other associations are possible, for example by means of an identifier associated with a radio network or a transponder that is proximate the charging station.

The applicable position of the charging station can be ascertained, for example, as a geographic position in a predetermined format, such as in a format known as a Receiver INdependent EXchange Format (RINEX). Alternatively, the position can be identified with any other location related information, such as a converted address, converted for a road network, for example with state, city, street, and house number.

The user may desire to use a specific charging station, for example because the specific charging station is at the user's home or is easily accessible at the home of relatives. Since the trip, or journey by the vehicle, is supposed to end precisely at this point, the specific charging station may be the ultimate destination. Entry of the ultimate destination may be stored in the database, and may be selected based on a user input. The selected entry may be displayed in the display as an information item. An information item may be a visual identifier in the display that is indicative of the ultimate destination, such as, for example, by means of a symbol or text. Thus, the information item may provide a description of the ultimate destination that can be recognized by the user.

The display may also include one or more target positions determined by the navigation system. A target position can also be called a waypoint. Target positions may represent charging stations between the current position of the vehicle, and the ultimate destination. The navigation system may identify one or more target positions and a route to each of the identified target positions based on a remaining charge on the energy storage device of an electric vehicle. During operation, the driver proceeding to an ultimate destination first wishes to reach the target position and the corresponding charging station in the selected entry with some amount of charge remaining in the energy storage device of the electric vehicle. For the reachability, therefore, the navigation system determines the target position and subsequently the stored position of the charging station are reachable with the current state of charge of the energy storage device.

The reachability of the target position is output by the computing device as an information item via the output device, such as by providing an icon and/or text on the display of the navigation system. The information item can be text and/or a symbol, for example.

In an example, one or more attribute(s) associated with the charging station may be stored in the entry in the database. The attribute(s) associated with the charging station may be a charging power or a number of charging slots or a type (private/public/business), or a time period of access, or a charging fee rate, or whether there are any open charging slots, and/or any other information related to the charging station. The reachability may be determined as a function of the attribute(s). For example, based on additional user input, such as user preferences or vehicle characteristics, some charging stations with specific attribute values are not identified in the display as reachable and/or selectable.

In another example, another information item associated with the attribute can be displayed. The another information item may be a third information item, which may be a symbol or text that is displayed in, for example, a text field in the display.

The information item of one example may be displayed by means of a symbol, preferably directly on a map view. The symbol on the map may be shown at the associated position of the charging station in the road network.

The embodiments described above are especially advantageous, both individually and in combination. All embodiments may be combined with one another. Some possible combinations are explained in the description of the exemplary embodiments from the figures. However, these possibilities of combinations of the embodiments introduced there are not exhaustive.

Shown schematically in FIG. 1 is an example of an electric vehicle 10 with a navigation system 20. The electric vehicle 10 has an energy storage device, for example in the form of a rechargeable battery 18. A charge state C of the energy storage device 18 can be transmitted on a charge status line to the navigation system 20. The energy storage device 18 can be detachably connected to a charging station 90 through an interface 19 for charging of the energy storage device 18 over a charging line with a charging current $I_C$. The interface 19 is, for example, a plug 19, in particular for three-phase power.

Alternatively the interface 19 can include a detachable coupling device, such as coils for magnetic coupling.

In addition, a data connection is provided between the charging station 19 and the navigation system 20 on a data line. In the exemplary embodiment from FIG. 1, the charging station 90 and the navigation system 20 are likewise connected through the interface 19 via the data line. Alternatively, or in addition, a radio connection can be provided between the charging station 90 and the navigation system 20 to wirelessly transmit and receive the data.

The navigation system 20 may also include a computing unit 21. The computing unit 21 may include a processor 28, such as, for example, a central processing unit (CPU), a microcontroller (uC), or some combination of different or the same processors in communication with memory 22. The processor 28 may be a component in a variety of systems. The processor 28 may be one or more general processors, digital signal processors, application specific integrated circuits, field programmable gate arrays, digital circuits, analog circuits, combinations thereof, or other now known or later developed devices for analyzing and processing data. The processor 28 may implement a software program, such as code generated manually or programmed.

The term "unit" may be defined to include executable modules. The modules may include software, hardware, firmware, or some combination thereof executable by the processor. Software modules may include instructions stored in memory, that may be executable by the processor 28 or other processor. Hardware modules may include various devices, components, circuits, gates, circuit boards, and the like that are executable, directed, or controlled for performance by the processor 28.

The computing unit 21 may also include and/or be in communication with a memory 22, of which at least a part may communicate via a bus 30. The memory 22 may be a main memory, a static memory, or a dynamic memory. The memory 22 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 22 may include a cache or random access memory for the processor 28. At least part of the memory 22 may be separate from the processor 28, such as a cache memory of a processor, the system memory, or other memory for storage of data and/or instructions. The memory 22 may include an external storage device for storing data and/or instructions. Examples include a hard drive, compact disc ("CD"), digital video disc ("DVD"), memory card, memory stick, floppy disc, universal serial bus ("USB") memory device, or any other device operative to store data. The memory 22 is operable to store instructions executable by the processor 28. The functions, acts or tasks illustrated in the figures or described may be performed by the programmed processor 28 executing the instructions stored in the memory 22. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The memory 22 may be a computer readable storage medium or machine readable medium and may include any non-transitory memory device that may include or store software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible storage medium upon which software is stored. The software may be electronically stored as an image or in another format (such as through an optical scan), then compiled, or interpreted or otherwise processed.

The computing unit 21 is connected to a position finding unit 23, indicated in the example of FIG. 1 as a global positioning system (GPS). The position finding unit 23 can be any form of position determination system. In the example of FIG. 1, a satellite receiver 23 with an antenna 24 that is configured to receive satellite signals (GPS, GLONASS, Galileo, etc.) is depicted. In other examples, any other form of position determination and tracking system may be used.

In the situation of the example system shown in FIG. 1, the computing unit 21 of the navigation system 20 is connected to the charging station 90 via a data line through the interface 19. The connection to the charging station 90 exists at least during the charging process and is broken when the electric vehicle 10 is driven away from the charging station 90. Thus, in the case of a wired connection through the interface 19 as illustrated, the connection is broken when the wired connection is disconnected at the interface 19. Alternatively, or in addition, in the case of a wireless connection, the connection may be broken when the vehicle is moved a predetermined distance away from the charging station, such as 10 to 20 meters The navigation system 20 may also include or be in communication with a user interface, such as a display 25, which can be connected to the computing unit 21 so that a map view may be output. The user interface may also include any other system or mechanisms, such as a button, a slider, a knob, a keypad, a keyboard, or a cursor control device, such as a mouse, or a joystick, touch screen display, remote control or any other device operative to interact with any of the components of the navigation system 20. The display 25 in the exemplary embodiment from FIG. 1 is implemented as a touch screen 25, wherein user inputs can be made through the touch-sensitive surface of the touch screen 25. Alternatively a beamer or audio voice output can be used.

In addition, the computing unit 21 of the navigation system 20 in the example of FIG. 1 is connected to memory 22 in the form of a storage unit that includes a database. In the exemplary embodiment from FIG. 1, the memory 22 and database is integrated in the navigation system 20. Alternatively, the memory 22 and database can be connected as an external device, for example through a network connection to the computing unit 21 of the navigation system 20.

When the electric vehicle 10 is connected to the charging station 90 in order to charge the energy storage device 18 of the electric vehicle 10 through the interface 19, for example by means of a charging plug, the energy storage device 18 is charged by the charging current $I_C$. Charging can be initiated by the connection to the charging station 90 through the interface 19. An entry E90 associated with the charging station 90 can be stored with a position P90 of the charging station 90 in the database 22 of the navigation system 20. If a check carried out by the navigation system 20 produces the result that no entry E90 is associated with the charging station 90 in the database 22, the entry E90 can be stored. In addition, the position P90 can be stored in the database in association with the corresponding entry E90 of the charging station.

In an example, the position P90 of the charging station 90 is ascertained by means of the position finding unit 23. Alternatively or in addition, the position P90 of the charging station 90 can be stored in a storage unit 91 of the charging station 90. In the exemplary embodiment from FIG. 1, memory 91 of the charging station 90. The memory 91 may be a storage device containing data in the form of a number of attributes 182, 183 associated with the charging station 90 such as, for instance, a charging power (max. current), a number of charging plugs, whether the charging station 90 is private or public, access times, electric charging rates, current use of charging plugs, an any other information related to the charging station, of which one or more can be stored as attributes in the entry E90 for the charging station 90 in the database in the memory 22 of the navigation system 20.

Figure 2:
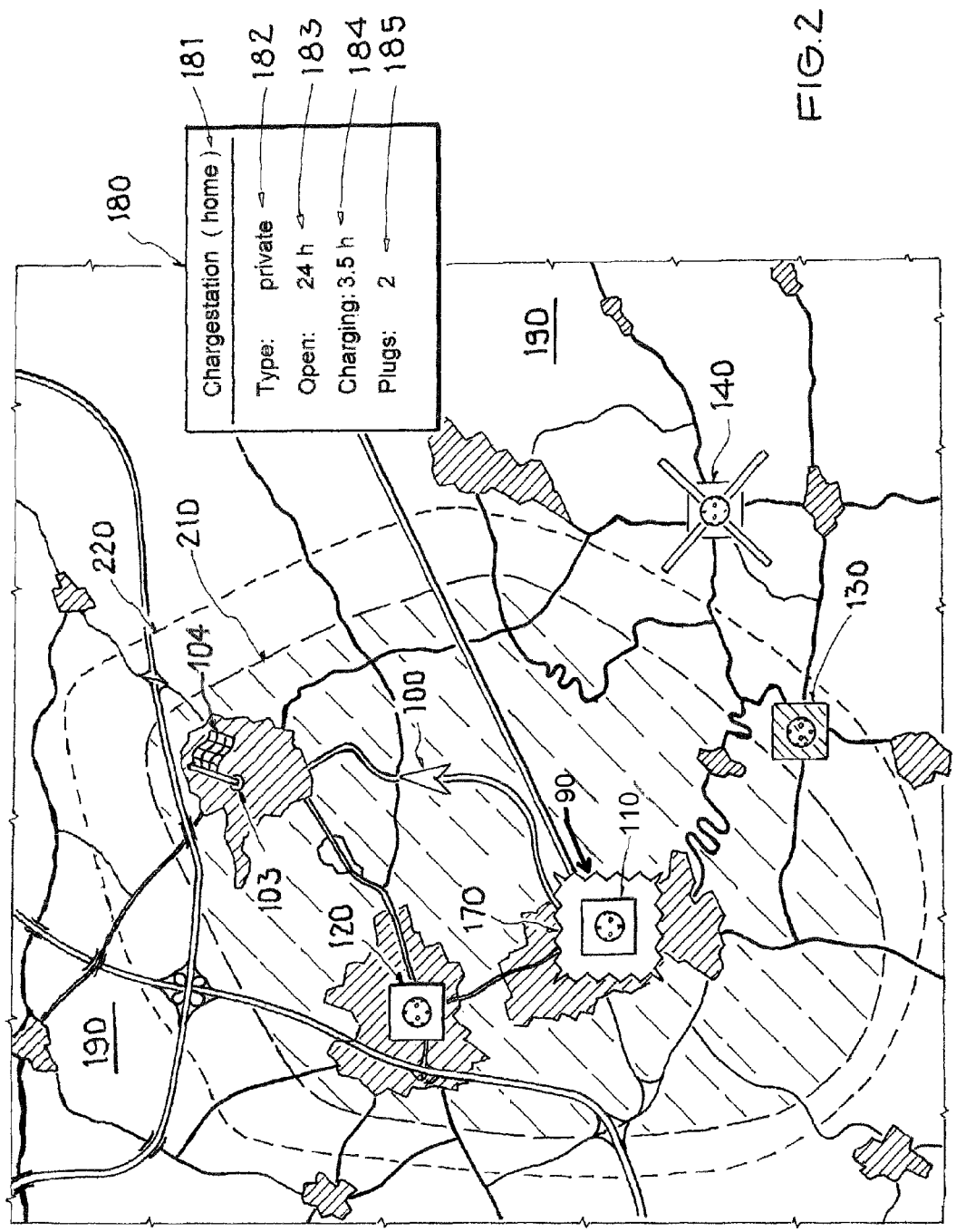
FIG. 2 is an example of a schematic map view.

In FIG. 2, an example of a map view 190 is shown schematically. The map view can be displayed using the user interface, such as by the touch screen 25 of the navigation system 20. Displayed in the example of FIG. 2 is a target position 103, which is a target destination to which an electric vehicle is proceeding. In addition, displayed are target symbols 110, 120, 130, 140, which are most likely targeted charging stations and their reachability in electric vehicles. The symbols 120, 130, 140 in FIG. 2 relate to corresponding charging stations, whereas symbol 110 represents the charging station 90 of FIG. 1, which can be an ultimate destination, such as home.

Direct information about reachability of important targets represented by symbols 110, 120, 130, 140, and the target position 103 is provided to a driver of an electric vehicle in order to relieve fears about running out of energy while driving. Important aspects to consider are, for example, the next target position having a charge station, such as those represented by symbols 110, 120, the target position 103 and especially most likely target symbols, such as symbols 110, 120 which can be learned automatically by the system by using the respective charge stations.

When driving the electric vehicle the driver mostly worries about whether or not he will be able to reach his target position 103, which is his desired destination, and return to charging station 90 represented by charging symbol 110, which is the ultimate destination, such as the user's home. Even if he reaches his target position 103, he worries whether he'll be able to return to home charging station 90 (FIG. 1). Drivers want to be assured that a target position 103 and the ultimate destination 90, (home) represented by target symbol 110 can be reached. To assure this, a selection of the charging station 90 as the ultimate destination, is ascertained by the processor based on a user input. The user input may be a default setting previously stored by the user in, for example, the database. Alternatively, or in addition, the user input may be a selection by the user from a user interface as part of preparing the route to the target position 103. Alternatively, or in addition, the user input may be received at any time identifying the ultimate destination. Following ascertainment of the ultimate destination as, for example, the charging station 90 (FIG. 1), the stored position P90 of the charging station 90, such as at the user's home, may be identified as the ultimate destination. A current position 100 of the electric vehicle 10 (FIG. 1) may also be ascertained and shown on the map view 190.

A reachability of a target position 103, which is separated from the current position 100 and the stored position P90 of the charging station 90 may also be ascertained by the processor. The ascertainment is based on the current position 100 of the electric vehicle 10, the stored position P90 of the selected charging station 90 represented by target symbol 110 and the current state of charge C of the energy storage device 18, so that the additional position represented by the target position 103 and subsequently the stored position P90 of the selected charging station 90 represented by target symbol 110 are reachable.

FIG. 2 shows the outputting of the reachability of the target position 103 in the form of an information item 104. In the example depicted in FIG. 2 the information item 104 is at least a flag symbol 104. In the following discussion, the reachability of the target position 103 and then subsequently the home position 90 represented by target symbol 110 is referred to as a second reachability, whereas a direct reachability to the charging station 90 represented by target symbol 110 is referred to as a first reachability.

In the example of FIG. 2, the first reachability of the stored position P90 of the charging station 90 from FIG. 1 is ascertained on the basis of a current charge state C of the energy storage device 18 and a current position 100 of the electric vehicle 10. In the map view 190 from FIG. 2, the first reachability is displayed on the touch screen 25 of the navigation system 20 with a first information item using symbols 110, 120, 130, 140. Each symbol 110, 120, 130, 140 here represents a charging station, and the symbol 110 represents the charging station 90 from FIG. 1.

The first reachability can be indicated by different colors of the symbols, for example green for "easy," yellow for "tight" and red for "not possible." In the example of FIG. 2 the symbols 110, 120, 130, 140 are different, with the symbols 110, 120 indicating "easy," the symbol 130 indicating "tight" and the symbol 140 indicating "not possible." As used herein, the term "easy" refers to a projection by the navigation system of having adequate stored charge to reach a destination with a significant amount of stored charge remaining in energy storage device of the electric vehicle so that the electric vehicle can be driven further. As used herein, the term "tight" refers to a projection by the navigation system of having enough stored charge to reach a destination, but with the charge on the energy storage device of the electric vehicle being almost completely depleted such that charging will be needed before the vehicle is driven much further. As used herein, the term "not possible" refers to a projection by the navigation system that there is inadequate stored charge to reach a destination and that the charge on the energy storage device of the electric vehicle will be depleted completely prior to arrival at the destination, unless re-charging occurs along the route.

Also shown in the map view 190 in FIG. 2 is the current position 100 in the road network of the electric vehicle 10. In addition, it can be seen that the user has retrieved the charging station 90 from the database, for example by touching the touch screen 25. The selection of the charging station 90, represented by target symbol 110 is highlighted by a symbol 170 in the map view. The selection is associated with a function that indicates that the driver wishes to return to this charging station 90 represented by target symbol 110 again at the end of the trip.

Using the position of the ultimate destination (charging station 90 (home) represented by target symbol 110) and the current position 100 as a basis, the computing unit 21 of the navigation system 20 is configured to calculate the second reachability. According to an example described using FIG. 2, the second reachability is indicated by area markers 210, 220 in the display, and is shown schematically in the map view 190 of FIG. 2. The area marker 210 in this example indicates "easy" where every location within the boundary line 210 can be reached and subsequently enough charge will remain in the energy storage device such that the electric vehicle 10 can reach the charging station 90 indicated by target symbol 110. In contrast, the additional boundary line 220 of the area indicates "tight" such that these destinations are only "barely reachable" in order to subsequently return to the charging station 90 indicated by symbol 110. It is shown schematically in the example of FIG. 2 that the target position 103, also referred to as waypoint 103, can be reached under the premise that it will be possible to return to the charging station 90 at charging symbol 110.

As an alternative to the explanation relating to FIG. 2, the area marker can be accomplished by coloring the unreachable region of the map 190 (not possible) red, and the barely reachable region of the map 190 (tight) yellow. The region of the map 190 that can be reached (easy) is not colored, for example.

According to one example the driver can see the following information at any time:
a) An indication whether the current target position 103 can be reached.
b) An indication whether the starting point, such as the position represented by target symbol 110, of this trip can be reached (go there and return).
c) An indication whether a specified home such as position represented by target symbol 110 can be reached after proceeding from a current location to a target position 103 (go there and return home).
d) An indication whether any known charging station 110, 120 can be reached after a target position 103 is reached (known charging stations 110, 120 can be determined by using services).
e) An indication whether any already used charging station 110 can be reached after a target position 103 is reached (already used charging stations may be private ones, which are not available to the public, thus, the system contains a charging station learning functionality).

All indications may be categorized: "easy," "tight," "not possible," and/or others.

In the example of FIG. 2, an info box 180 is also illustrated. The info box 180 may be a pop up box providing information related to one or more of the charging stations, the navigation route, or any other navigation system related information. The info box 180 may include attributes 181, 182, 183, 184, and 185. In the example of FIG. 2, the info box 180 provides information related to a charging station, where the attribute 181 is an identifier attribute that identifies the charging station, attribute 182 is a type attribute that identifies the type of charging station, such as private, semi-private or public, for example, attribute 183 is a availability attribute that provides the availability of the charging station, such as 24 hours, closed, presently full of users, X open plug in locations currently available, or other availability related information. In addition, attribute 184 may be a capacity attribute, which may provide information that is used by the computing device 21 in connection with the current charge on the energy storage device of the vehicle to calculate the time it will take to charge a user electric vehicle. Also, attribute 185 may be a feature attribute that describes additional features available at the charging station such as a number of plugs available, amenities such as food or drinks, mechanic capabilities, or any other features available at the charging station. In other examples, the user may configure the information provided in the info box 180, the charging station may dictate the contents of the info box 180, or the navigation system may determine the contents of the info box 180.

The navigation system may also take in to account that the electric vehicle will be partially or completely charged at one or more charging stations along the route to or from the target position 103, or at the target position 103. Charging stations where the user anticipates partially or completely charging the electric vehicle may be indicated by the user. Accordingly, the navigation system can determine the level of charge needed at the identified charging stations in order to reach the target position 103 and return to the ultimate destination, such as charging station 90. The level of charge needed may be output to the user interface, such as a display device as a charge time indication. Accordingly, the user may select different charging stations in an effort to minimize the charge time indication. Alternatively, or in addition, the navigation system may identify the optimum charging stations where the user should stop and re-charge the energy storage device in order to minimize charge time. Alternatively, or in addition, the navigation system may use a user profile and/or other travel conditions in selecting charging stations in order to reach the target position 103 and return to the ultimate destination. For example, the navigation system may take into account the time of day and a user dining preferences to select a charging station near a restaurant favoured by the user when a longer charging time is dictated.

The navigation system is not restricted to the examples shown in FIGS. 1 and 2. For example, it is possible to use a different indication of reachability, such as, for example, a list of the charging stations 110, 120 and waypoints 103. The list can be provided by the user interface, such as projected onto a window of the vehicle by means of a projector, for example. It is also possible to use a different type of area marker, such as, e.g., color highlighting. The functionality of the system shown in FIG. 1 can especially be used to good advantage for a navigation system of a purely electric powered vehicle.

LIST OF REFERENCE CHARACTERS

10 electric vehicle
18 energy storage device, rechargeable battery
19 interface
20 navigation system
21 computing unit, CPU, uC
22 database
23 position finding unit, GPS receiver
24 antenna
25 display, touch screen
28 processor
90 charging station
91 storage unit
100 current position
103 target position, additional position
104 flag symbol
110, 120, 130, symbol, charging station
140
170 marking
180 PopUp, Infobox
181, 182, 183, attribute
184, 185
190 map
210, 220 area
E90 entry, database entry
C charge state
$I_C$ charging current
P90 position

I claim:
1. A method for operating an electric vehicle comprising the steps:
ascertaining, with a processor, a selection of a charging station based on a user input, where a position of the selected charging station is stored in a database, and is an ultimate destination of the electric vehicle subsequent to reaching a target position;

ascertaining, with the processor, a current position of the electric vehicle;

ascertaining, with the processor, a reachability of the target position, the target position separated from the current position and the stored position of the selected charging station, where the ascertainment is based on the current position of the electric vehicle, the stored position of the selected charging station, and a current state of charge of an energy storage device included in the electric vehicle, so that the target position and subsequently the stored position of the selected charging station are reachable with only the current state of charge of the energy storage device; and outputting by the processor the reachability of the target position with an information item provided for display on an output device of a navigation system of the electric vehicle, the information item including an area marking displayed on the output device as a line or polygon enclosing an area in which any one location of a plurality of locations within the line or polygon and subsequently the stored position of the selected charging station are reachable with only the current state of charge of the energy storage device.

2. The method according to claim 1, where outputting by the processor the reachability of the target position further comprises outputting the information item in a form of a symbol for display on a map view.

3. The method according to claim 1, where the area marking includes a plurality of boundary lines or polygons indicating different levels of reachability of locations within each boundary line or polygon, where each level of reachability defines an amount of stored charge remaining in the energy storage device after reaching an associated location and the stored position.

4. The method according to claim 1, further comprising the additional step of displaying the selection of the charging station by a selection item.

5. The method according to claim 4, where the selection item includes at least one of a marking, a symbol, or text that is particularly displayed on a map view.

6. The method according to claim 1, where the reachability of the target position is ascertained by the processor after the selection of the charging station, with the stored position of the charging station being the ultimate destination.

7. The method according to claim 1, further comprising: additionally ascertaining, with the processor, a direct reachability of the stored position of the charging station based on the current charge state of the energy storage device and the current position of the electric vehicle, and the processor outputting the direct reachability of the stored position of the charging station for display on the output device of the navigation system using an additional information item.

8. The method according to claim 1, further comprising the processor storing an entry associated with the charging station in association with a position of the charging station in a database of the navigation system of the electric vehicle, the storing being initiated by the processor in response to a connection to the charging station and the entry associated with the charging station not being present in the database.

9. The method according to claim 1, further comprising: storing an attribute associated with the charging station as an entry in the database; where ascertaining, with the processor, the reachability of the target position comprises determining the reachability of at least one of the target position or the direct reachability of the stored position as a function of the attribute; and outputting, with the processor, a third information item associated with the attribute.

10. The method according to claim 1, further comprising displaying a storage of an entry of the database, such that during display of the storage, the entry can be modified or deleted in response to a user input.

11. A navigation system of an electric vehicle comprising:
a computing unit configured to ascertain a selection of a selected charging station based on a user input, where a stored position of the charging station is an ultimate destination of the electric vehicle subsequent to reaching a target position;

the computing unit further configured to ascertain a current position of the electric vehicle;

the computing unit further configured to ascertain a reachability of a target position separated from the current position and the stored position of the selected charging station so that the target position and the stored position of the selected charging station are subsequently reachable with only a current state of charge of an energy storage device included in the vehicle, where ascertainment of the reachability is based on the current position of the electric vehicle, the stored position of the selected charging station and the current state of charge of the energy storage device; and the computing unit further configured to output the reachability of the target position using an information item that is output for display with an output device of the navigation system of the electric vehicle, the information item including an area marking displayed on the output device as a line or polygon enclosing an area in which any one location of a plurality of locations within the line or polygon and subsequently the stored position of the selected charging station are reachable with only the current state of charge of the energy storage device.

12. The navigation system of claim 11, where the computing unit is configured to receive attributes of a charging station, the attributes displayable with the output device of the navigation system.

13. The navigation system of claim 12, where the stored position of the charging station is stored in a database in association with the attributes of the charging station.

14. The navigation system of claim 11, where the information item comprises a symbol or text for display with a display device on a map view.

15. The navigation system of claim 11, where the computing unit is further configured to ascertain a reachability of the stored position of the selected charging station based on the current state of charge of the energy storage device and the current position of the electric vehicle, the computing unit further configured to output both the reachability of the target position using an information item and the reachability of the stored position of the selected charging station for display with the output device of the navigation system.

16. A computer readable storage medium configured to store instructions executable by a processor for a navigation system of an electric vehicle, the computer readable storage medium comprising:
instructions executable by the processor to receive and store in a database an identifier of a charging station and a position of the charging station;
instructions executable by the processor to receive a selection, via user input, of the charging station as an ultimate destination and receive an indication of a target destination defined as a waypoint between a current location of the electric vehicle and the charging station;

instructions executable by the processor to determine the current location of the electric vehicle;

instructions executable by the processor to calculate a route to the target destination and subsequently to the position of the charging station in response to the user input;

instructions executable by the processor to receive a current state of charge of an energy storage device included in the electric vehicle;

instructions executable by the processor to ascertain, based on the current location and the current state of charge, that the electric vehicle can travel to the target destination and subsequently travel to the position of the charging station using only the current state of charge of the energy storage device;

instructions executable by the processor to generate an information item for display on a display device, the information item indicative that the electric vehicle can reach the target destination and return to the position of the charging station;

instructions executable by the processor to ascertain an area within which the electric vehicle can reach target positions and return to the position of the charging station; and instructions executable by the processor to output for display with the display device an area marking on a map view within which target locations are indicated as reachable as the target destination, the area marking including a polygon enclosing the area in which any one target position within the line or polygon and subsequently the position of the charging station are reachable with only the current state of charge of the energy storage device.

17. The computer readable storage medium of claim 16, wherein the area marking includes a plurality of boundary polygons indicating different levels of reachability of target positions within each boundary line or polygon, where each level of reachability defines an amount of stored charge remaining in the energy storage device after reaching an associated target position and the position of the charging station.

18. The computer readable storage medium of claim 16, wherein the instructions executable by the processor to generate the information item for display on the display device further comprise instructions executable by the processor to output for display with the display device a symbol on a map view in association with the target destination.

19. The computer readable storage medium of claim 18, wherein instructions executable by the processor to receive the selection of the charging station as the ultimate destination and receive the indication of the target destination further comprise instructions executable by the processor to output for display with the display device a symbol on a map view in association with the charging station indicative that the charging station is the ultimate destination.

20. The computer readable storage medium of claim 16, further comprising: instructions executable by the processor to calculate a route from the current location to the position of the charging station; instructions executable by the processor to ascertain, based on the current location and the current state of charge, that the electric vehicle can reach the position of the charging station from the current location using only the current state of charge of the energy storage device; and instructions executable by the processor to generate the information item for display on the display device, the information item comprising a first information item indicative that the electric vehicle can reach the target destination and subsequently return to the position of the charging station and a second information item indicative that the electric vehicle can reach the position of the charging station.

\* \* \* \* \*